United States Patent [19]

Mühlfeld et al.

[11] Patent Number: 5,665,148
[45] Date of Patent: Sep. 9, 1997

[54] ADSORPTION AIR FILTER AND METHOD FOR ITS PRODUCTION

[75] Inventors: Horst Mühlfeld, Grasellenbach; Hansjörg Grimm, Weinheim; Peter Grynaeus, Birkenau; Thomas Dabisch, Mörlenbach; Harald Stini, Birkenau, all of Germany

[73] Assignee: Firma Carl Freudenberg, Weinheim, Germany

[21] Appl. No.: 550,426

[22] Filed: Oct. 30, 1995

[30] Foreign Application Priority Data

Dec. 1, 1994 [DE] Germany ............... 44 42 713.1

[51] Int. Cl.$^6$ .................................. B01D 53/04
[52] U.S. Cl. ............... 96/153; 55/524; 55/DIG. 5
[58] Field of Search ................... 96/153; 55/524, 55/DIG. 5; 210/502, 510

[56] References Cited

U.S. PATENT DOCUMENTS

| | | | |
|---|---|---|---|
| 1,966,553 | 7/1934 | Kropp | 55/524 X |
| 2,204,910 | 6/1940 | Randolph | 55/524 X |
| 2,765,046 | 10/1956 | Rondholz | 55/524 X |
| 3,091,550 | 5/1963 | Doying | 96/153 X |
| 3,375,933 | 4/1968 | Rodman | 55/524 X |
| 3,474,600 | 10/1969 | Tobias | 55/524 |
| 3,538,020 | 11/1970 | Heskett et al. | 96/153 X |
| 3,545,622 | 12/1970 | Sakhnovsky et al. | 96/153 X |
| 3,645,072 | 2/1972 | Clapham | 55/524 X |
| 3,687,297 | 8/1972 | Kuhn et al. | 96/153 X |
| 3,721,072 | 3/1973 | Clapham | 55/524 X |
| 3,783,085 | 1/1974 | Pearson et al. | 55/524 X |
| 3,857,732 | 12/1974 | Yoshino | 55/524 X |
| 3,919,369 | 11/1975 | Holden | 96/153 X |
| 4,013,566 | 3/1977 | Taylor | 55/524 X |
| 4,061,807 | 12/1977 | Shaler et al. | 210/502.1 X |
| 4,518,704 | 5/1985 | Okabayashi et al. | 96/153 X |
| 4,664,683 | 5/1987 | Degen et al. | 55/524 X |
| 4,665,050 | 5/1987 | Degen et al. | 55/524 X |
| 5,033,465 | 7/1991 | Braun et al. | 55/524 X |
| 5,332,426 | 7/1994 | Tang et al. | 96/153 |

FOREIGN PATENT DOCUMENTS 58-058129  12/1983  Japan .................... 55/524

OTHER PUBLICATIONS

DIN EN 29 053, May 1993, Preisgr. 8.
DIN 71460-2, Nov. 1994, Preisgr. 07.
DIN 53735/02.88—DIN ISO 1133/Feb. 1993.

*Primary Examiner*—Robert Spitzer
*Attorney, Agent, or Firm*—Kenyon & Kenyon

[57] ABSTRACT

An adsorption air filter has a self-supporting shaped structure of adsorber particles of regular or irregular form, which are joined to one another by binder particles also of regular or irregular form. The melting range of the binder particles is less than that of the adsorber particles, and the binder particles are smaller than the adsorber particles. The adsorber particles have an average size of 100 to 7000 μm. The three-dimensional structure of the air filter has substantially repeating units of one adsorber particle and one binder particle, without the presence of agglomerates. The binder must not spread over the adsorber surface below 100° C. In the production method, adsorber and binder particles are mixed with water and heated in a closed mold under pressure; the water is then driven off and the shaped element is allowed to cool.

13 Claims, No Drawings

ADSORPTION AIR FILTER AND METHOD FOR ITS PRODUCTION

BACKGROUND OF THE INVENTION

The present invention relates generally to an air filter and, more particularly, to an adsorption air filter having a self-supporting shaped structure of adsorber particles and a method for the production of such an air filter.

U.S. Pat. No. 5,332,426 issued to Tang et al.(hereinafter "Tang") on Jul. 26, 1994 discloses a self-supporting filter structure made of adsorber and binder particles, having not only good filter performance and good adsorption capacity, but also a very low pressure drop, i.e. high air permeability. This feature is important for use as an air preparation filter, indoor air filter, automobile ventilation filter for the interior of an automobile, and as a filter in disposable gas masks.

In this connection, Tang proposes a self-supporting shaped structure of adsorber particles of irregular form, which are joined to one another by thermoplastic binder particles, also of irregular form, the binder particles being substantially smaller than the adsorber particles. In the interest of a low pressure drop, a plurality of adsorber and binder particles are welded together into agglomerates whose shape and distribution are also irregular. They possess an average size of at least 15 mesh. Located between these agglomerates are gaps which are free of material and constitute a pore volume in the filter of approximately 70 to 85%. The result is therefore a low-density open matrix.

The production method involves preheating the adsorbing particles to a temperature above the melting range of the binder; subsequently mixing the heated adsorber particles with the thermoplastic binder particles to form agglomerates with a fineness of at least 15 mesh; sieving out defined agglomerate fractions; shaping the agglomerates into the desired flat shaped elements in an open mold; and heating the flat shaped element to a temperature above the melting range of the binder. The agglomerated filter member is available after cooling.

Configuring the agglomerates requires two separate process steps, namely heating before and after mixing, Which requires a considerable outlay of time and energy; durations of 40 minutes are cited for each process step. To avoid density gradients inside the shaped structure, it is advised that the mold be inverted at least once as the mixture is being heated. This stipulation again makes the production process longer. With the known procedure, yet another process step is necessary in order to add an adsorption auxiliary, e.g. $K_2CO_3$ as an aqueous solution, to the adsorber particles prior to the first heating. This treatment is used for chemisorption of acid gases by neutralizing them.

In the air filter itself, the relatively large spaces (pores) between the agglomerates contribute to a definite decrease in pressure drop. In practice—and as is also apparent from the Figures of Tang—gaps of such large dimensions mean that a considerable quantity of gas molecules intended for absorption pass through these gaps without coming into the physical influence region of the absorptive surfaces of the adsorbent. Therefore, this effect worsens the adsorption kinetics of the filter. The present invention is directed to providing an air filter and a method for its production that eliminates each of the aforesaid disadvantages.

SUMMARY OF THE INVENTION

The present invention solves these problems by providing an air filter having adsorber particles that are bonded together by binder particles to form a self-supporting structure that is substantially free of homogeneous agglomerate structures uniformly distributed within the filter structure and visible to the naked eye. The filter structure according to the present invention has no gaps of such large dimensions that the adsorption kinetics are thereby worsened in the manner described above. Nevertheless, the pressure drop is comparable with the low values achieved with the structure according to the prior art which has agglomerates. The filter structure is formed by mixing adsorber and binder particles. During mixing, water is added to the mixture. If desired sorption-promoting substances can be added to the water prior to adding the water to the mixture. This mixture is placed in a pressure-tight mold and heated to at least 100° C. and at least 5° C. above the melting range of the binder particles, but below the melting range of the adsorber particles. The mixture is then decompressed and removed from the mold after cooling. The agglomerate-forming steps, particularly the preheating of the adsorber particles, are eliminated from the production method of the present invention. Effects resulting from the inherent weight of the bulk fill in the mold before and during the sintering process are avoided. Addition of any sorption auxiliaries that may be used is not performed in a separate process step, but integrated into the process sequence itself. The filter performance, i.e. high air permeability, adsorption kinetics, and adsorption capacity, do not deviate significantly from the air filter structure of the prior art.

DETAILED DESCRIPTION

Both the adsorber and binder particles can have any desired regular or irregular shape; the melting range of the binder particles is to be less than that of the adsorber particles. This is understood to mean, regardless of the measurement method, that at the lowest temperature at which the binder is entirely in the molten state, the adsorber must not under any circumstances begin to melt.

The average size of the binder particles can be 5 to 90% of that of the adsorber particles, and is advantageously selected so that the smallest possible volume of binder not affecting filter performance is present, but the adsorber particles nevertheless adhere permanently to one another.

The absolute size of the adsorber and binder particles is subject, in the context of the present invention, to much less restriction than in the prior art according to Tang. For example, the adsorber particles can have a size of between 100 and 7000 µm, and an irregular or regular shape, the latter being for example spherical, quadratic, or even rod-like. With the latter configuration, the term "particle size" is understood to mean the length of the rods.

The basic premise must of course be the rule known in filter technology, that smaller particles of adsorptive material exhibit better filter performance, i.e. adsorption kinetics, but at the cost of a higher pressure drop.

This self-supporting air filter structure is substantially free of homogeneous agglomerate structures, uniformly distributed within the entire filter structure, that would be visible to the naked eye. Instead it has a completely irregular distribution of adsorber and binder particles, with the result that uniform patterns of agglomerate structures are not detectable with the naked eye. As a result, the pore volume is also substantially smaller, with these pores occurring in each unit volume more frequently than in the case of the prior art.

The binder to be used is subject to limitation in terms of the process only in that below 100° C. it must not spread over the adsorber surface and therefore not occupy it. Materials such as polyolefins, polyacrylates, polyaryls, polyamides, and especially thermoplastic or cross-linking elastomers, such as polyurethanes or polydiene polymers, or block copolymers, are therefore suitable.

Because of good adhesion to the adsorber particles, hydrolysis stability, elasticity, and melting characteristics particularly suitable for the method according to the invention, a thermoplastic polyurethane binder has been found to be particularly advantageous. It possesses a melting range of 130° to 140° C., and between 130° and 180° C. occurs as a highly viscous melt whose viscosity changes only slightly over that temperature range:

6.4 g/10 min at 140° C. and 2.16 kp load;
15.4 g/10 min at 160° C. and 2.16 kp load;
30.9 g/10 min at 180° C. and 2.16 kp load
(All readings per DIN 53 735).

This polyurethane binder is made up of polycaprolactone, diphenylmethanediisocyanate and a combination of the chain extenders 1,4-butenediol and 1,6-hexenediol.

The air filter according to the invention possesses a pore volume of 65 to 80%, depending on the shape and size of the adsorber particles. Its density is between 0.22 and 0.35 g/cm$^2$.

As will be shown later in the examples, air permeabilities of 80 to 95 l/m$^2$s can be achieved on samples 10.0 mm thick, measured per DIN EU 29 053A (flow resistance measurement) at 0.02 mbar.

The n-butane adsorption capacity, measured on the basis of DIN 71 460, Part (November 1994 draft) at a filter volume of 30 cm$^3$, is 199 mg, measured at a volume flow of 30,000 cm$^3$/min and determined by the integral method in the range from 0% to 95% penetration.

On the basis of these data, the air filters according to the invention prove suitable, depending on which aspect of the requirements is emphasized, both for ventilation and air-conditioning systems for interiors of any type, including vehicles, where a low pressure drop is important; and for gas masks, in which adsorption performance is paramount. There is no worsening in parameters relevant to filtration when compared with the prior art, as illustrated in the examples discussed below.

In most cases activated charcoal is preferred as the adsorber material because of its broad applicability, availability, and lack of toxicity. To improve the handling characteristics of the filter during the production process and to protect the sorption layer, the use of textile coverings has proven advisable. This covering is fastened to the air filter by welding or clamping.

"Sorption" here refers to all processes in which a gaseous substance is selectively taken up, by adsorption or chemisorption, by another solid substance coming into contact with it. Without limiting the invention to the following substances, examples include activated charcoal and bone charcoal, silica gel, fuller's earths, diatomaceous earth, activated aluminum oxide and activated bauxite, and potassium carbonate.

The air filter structure can be specifically adapted in any shape to utilization conditions and to the space requirements of an application. It is also possible to structure one or both surfaces of the filter, or to configure the entire filter in an accordion shape so as to utilize the available space with the largest possible filter mass while also having high air permeability. This is particularly important when the air filter is to be a component of an air delivery apparatus for interior ventilation and/or air conditioning of motor vehicles.

The production method includes the following steps:

Subject to the aforementioned limitations regarding particle sizes, relative quantities, and materials, adsorber particles are mixed with binder particles at a weight ratio of from 70:30 to 95:5. As mixing continues, 15 to 70 wt % water (referred to the total mixture of adsorber, binder, and water) is added. Within these limits, smaller average adsorber material particle sizes correspond to the higher proportion of binder, and vice versa. The mixing process takes place at room temperature, and generally takes up to five minutes.

The mixture can be produced in any apparatus which ensures homogeneous mixing. Preferably a tumble mixer is used.

The mixture produced in this manner is placed, as a loose bulk fill, in the cavity of a heatable pressing mold that can be sealed pressure-tight. The latter must be designed for a pressure of at least 10$^6$ Pa.

Once the mold is closed, the mixture therein is heated to a temperature of at least 100° C. and at least 5° C. above the melting range of the binder, but below the melting range of the adsorber, for 5 to 10 minutes. The water vapor produced as a result creates a pressure inside the compact.

Decompression then occurs with release of water vapor; this is complete after 3 to 5 minutes.

After cooling, the self-supporting shaped filter structure is removed from the mold cavity.

The water added to the adsorber/binder mixture at room temperature occupies adsorptive surfaces of the adsorber particles, thus preventing them from being excessively coated with hotmelt adhesive compound. During heating under pressure, the vapor produced holds the adsorptive pores of the adsorber particles open, and also uniformly loosens the structure of the adsorber/binder particles. In the bulk filter material, this water vapor forms macroscopic cavities which are conducive to a low pressure drop in the finished filter. It is therefore no longer necessary to form agglomerates, in an additional and time-consuming process step, to achieve the same goal.

The resulting filter plate has a particularly homogeneous structure, which leads to high bending strength. Essentially no agglomerate structures are detectable with the naked eye. The adsorber and binder particles are distributed in entirely random fashion both on the surface and within the volume. The addition of water means that this distribution is already present in the mixture. In contrast to the prior art, the inherent weight of the bulk material therefore no longer plays a role, thus also eliminating the need to turn the mold, in some cases repeatedly, during heating.

A further advantage of the presence of water during the molding process, albeit in vapor form, consists in the ability of water vapor to accelerate heat transfer from the mold walls through the bulk material, thus improving the cost-effectiveness of the method due to shorter cycle times.

Since activated charcoal is known to be particularly resistant to pressure and temperature influences, even in the presence of water vapor, this adsorbent is preferably used for the method according to the invention.

Thermoplastic polyurethane with a melting range of 130° to 140° C. has proven particularly advantageous for the requirements of the method according to the invention. In the range up to 180° a highly viscous melt is present, the viscosity of which is largely independent of temperature. This polyurethane is particularly suitable because of its polycaprolactone soft segment structure, since it is hydrolysis-stable in the presence of water vapor under the use conditions of the completed filter. The low melting point and almost constant melt viscosity over a wide temperature range, already mentioned above, are achieved by a hard segment portion having 1,4-butenediol and 1,6-hexenediol, combined with diphenylmethanediisocyanate.

The shaped members can be combined together as desired into multilayer filters, and can also be provided on their surfaces with a structure corresponding to the mold walls. The term "shaped member" can also certainly be understood as a folded zig-zag shape.

The method makes it possible, in a particularly elegant and labor-saving manner, to add, if necessary, sorption-promoting substances that are dispersible or soluble in water, or $K_2CO_3$ for chemisorption (neutralization) of acid gases. These additives are simply added in the desired quantity, prior to creation of the mixture, to the water used for that purpose. The uniform distribution of pressure, temperature, and material in the mold cavity during pressing ensures that these auxiliaries uniformly coat the sorptive surfaces.

In addition to the possibility of combining together at least two shaped air filter elements with different sorption-promoting and other adjuvant additives following individual production, one particularly advantageous variant of the method consists in configuring the loose bulk material in the mold cavity as a layered structure of at least two adsorber/binder phases, different quantities of sorption-promoting auxiliary substances being mixed into the individual phases. The result, after pressing, is a shaped element with multiple layers in cross section, with different sorption properties in its layers.

The examples below are intended to illustrate the invention. Example 1 describes the production and properties of a preferred embodiment of the filter structure. Example 2 discusses the use of larger adsorber particles with a reduced quantity of binder. Example 3 illustrates an embodiment combining materials from Example 1 and Example 2. The next and final comparative example shows measured filtration data for the prior art.

EXAMPLE 1:

The following are mixed for 5 minutes in a tumble mixer at room temperature:

1. 100.0 g of activated charcoal in granule form with a particle size of 300 to 800 μm;
2. 18.0 g of thermoplastic polyurethane powder with a particle size of 10 to 350 μm, with a melting range of 135° to 140° C. and with melt index values of 6.4 g/10 min at 140° C., 15.4 g/10 min at 160° C., and 30.9 g/10 min at 180° C., measured in each case per DIN 53 753 and at a load of 2.16 kp; and
3. 80.0 g water.

The mixture is then placed, as a loose bulk fill, in a tightly sealable mold designed for high pressure loads with inside dimensions 188 mm×250 mm×15 mm. The mixture is heated to 180° C. for 6 minutes in the closed mold. The water vapor that forms is then discharged within 3 minutes by opening a valve connected to the mold, and at the same time the internal pressure in the mold is released. After cooling, a stable, open-pore plate with a thickness of 10 mm and a density of 0.25 g/cm³ is unmolded.

Air permeability as measured on the shaped element per DIN EU 29 053A is 91 l/m².s. Adsorption of n-butane (integral method in the range from 0% to 95%, based on DIN 71 460, Part 2, November 1994 draft) is 199 mg n-butane. The complete profile for this adsorption is evident from the table at the end of the Examples.

EXAMPLE 2:

The following are mixed for 5 minutes in a tumble mixer at room temperature:

1. 120.0 g of activated charcoal in granule form with a particle size of 500 to 1600 μm;
2. 14.4 g of thermoplastic polyurethane powder as in Example 1; and
3. 84.0 g of water.

The mixture is shaped into an open-pore plate under applied pressure followed by decompression. The shaped element, with a density of 0.28 g/cm³, exhibits an air permeability of 84 l/m².s at 0.02 mbar, and an n-butane adsorption of 194 mg (see table for complete profile).

EXAMPLE 3:

The following are mixed for 5 minutes in a tumble mixer at room temperature:

1. 60.0 g of activated charcoal in granule form with a particle size of 300 to 800 μm;
2. 60.0 g of activated charcoal in granule form with a particle size of 500 to 1600 μm;
3. 18.0 g of polyurethane powder as in Example 1; and
4. 90.0 g of water.

The mixture is shaped into an open-pore plate with a density of 0.29 g/cm³. The plate yields an air permeability value of 87 l/m².s at 0.02 mbar, and n-butane adsorption of 196 mg (see table for complete profile).

Comparative Example

A commercially available filter, which at the time of the invention was being installed in BMW E38 vehicles and which has a regular structure, detectable to the naked eye, corresponding to the filter disclosed by Tang, was tested in accordance with Example 1. Air permeability was 87 l/m².s at 0.02 mbar. N-butane adsorption was measured as 148 mg. The complete n-butane adsorption profile is presented in the table.

It is evident from the examples and the table that in an adsorptive air filter structure, a combination of a very low pressure drop with concurrently high adsorption performance can be realized by means of the present invention with no impairment of adsorption kinetics and without the time-consuming process step of agglomerate formation.

TABLE 1

Total profile of a n-butane adsorption
(based on DIN 71 460, Part 2, November 1994 draft)

| | Gas penetration (%) | | | |
|---|---|---|---|---|
| Time (seconds) | Ex. 1 | Ex. 2 | Ex. 3 | Comparative example |
| 10 | 1.7 | 4.3 | 3.1 | 2.3 |
| 50 | 3.3 | 15.1 | 9.0 | 7 |
| 90 | 5.1 | 19.6 | 12.1 | 8.9 |
| 130 | 6 | 21.7 | 13.2 | 10.2 |
| 170 | 6.9 | 23.4 | 15.0 | 11.4 |
| 210 | 7.7 | 25.1 | 16.1 | 12.5 |
| 330 | 10 | 29 | 19.7 | — |
| 610 | 15.7 | 36.1 | 26.2 | 24.2 |
| 1210 | 30.9 | 47.8 | 37.8 | — |
| 1810 | 48.3 | 57.8 | 54.5 | 64.7 |
| 3010 | 77 | 74.1 | 76.2 | 87.4 |
| 3610 | 84.9 | 80.3 | 83.5 | 92.5 |
| 4090 | — | — | — | 94.9 |
| 4210 | 90.2 | 84.5 | 88.4 | — |
| 4810 | 93.1 | 88.4 | 92.0 | — |
| 5130 | 95 | — | — | — |
| 6250 | — | — | 95.5 | — |
| 7370 | — | 94.7 | — | — |

What is claimed is:

1. An adsorption air filter, having a self-supporting shaped structure, comprising:

adsorber particles of regular or irregular form, having an average size of 100 to 7000 μm; and binder particles of regular or irregular form, the melting range of the binder particles being less than that of the adsorber particles, and the average size of the binder particles being less than that of the adsorber particles, wherein the binder does not spread over the surface of the adsorber particles at temperatures below 100° C. and the binder particles are a thermoplastic polyurethane having a melting range from 130° to 140° C., the thermoplastic polyurethane including a soft-segment portion of polycaprolactone and a hard-segment portion of 1,4-butanediol and 1,6-hexanediol with diphenylmethane diisocyanate, and between 130° and 180° C. the thermoplastic polyurethane occurs as a highly viscous melt with a viscosity which changes only slightly over the temperature range from 130° to 180° C., said adsorber particles being joined to one another by the binder particles; and wherein the self-supporting structure has a substantially irregular three-dimensional distribution of the adsorber and binder particles, the self-supporting structure being free of homogeneous agglomerate structures which are distributed uniformly within the entire filter volume and are visible with the naked eye.

2. The air filter according to claim 1, wherein the air filter has an air permeability of 80 to 95 l/m$^2$.s, measured at 0.02 mbar per DIN EU 29 053A, between opposing surfaces of the air filter spaced 10.0 mm apart.

3. The air filter according to claim 2, wherein the adsorber is activated charcoal.

4. The air filter according to claim 1, wherein the adsorber is activated charcoal.

5. The air filter according to claim 4, having an n-butane adsorption capacity, measured on the basis of DIN 71 460, Part 2 (November 1994 draft), of mg/30 cm$^3$ of filter volume at a volume flow of 30,000 cm$^3$/min, measured according to the integral method, in the range from 0% to 95% penetration.

6. A method for producing a self-supporting, shaped adsorption air filter, comprising the following steps:

a) mixing, at room temperature for about 5 minutes: 70 to 95 wt % adsorber particles, 5 to 30 wt % binder particles and 15 to 70 wt % water relative to the total mixture of adsorber, binder, and water, said adsorber particles having regular or irregular form with an average size of 100 to 7000 μm, said binder particles having regular or irregular form with an average particle size from 90 to 5% of that of the adsorber particles, the melting range of the binder particles being less than that of the adsorber particles, and the binder not spreading over the adsorber surface below 100° C., wherein a smaller average adsorber particle size is associated with a higher proportion of binder, and wherein the binder particles are a thermoplastic polyurethane having a melting range from 130° to 140° C., the thermoplastic polyurethane having a melting range from 130° to 140° C., the thermoplastic polyurethane including a soft-segment portion of polycaprolactone and a hard-segment portion of 1,4-butanediol and 1,6-hexanediol with diphenylmethane diisocyanage, and between 130° and 180° C. the thermoplastic polyurethane occurs as a highly viscous melt with a viscosity which changes only slightly over the temperature range from 130° to 180° C.;

b) transferring the mixture, as a loose bulk material, into a cavity of a heatable pressing mold that can be closed pressure-tight and is designed for a pressure load of at least 10$^6$ Pa;

c) closing the pressing mold in a pressure-tight manner;

d) heating the mixture in the closed mold for 5 to 10 minutes to a temperature of at least 100° C. and at least 5° C. above the melting range of the binder, but below the melting range of the adsorber so that the binder particles bind the adsorber particles to form the self-supporting shaped air filter;

e) decompressing the mold and releasing water vapor from the mold and the shaped air filter;

f) cooling the shaped air filter to room temperature; and g) removing the self-supporting shaped air filter from the mold cavity.

7. The method according to claim 6, wherein activated charcoal particles are used as the adsorber.

8. The method according to claim 7, further comprising the step of adding water-soluble or water-dispersible sorption-promoting adjuvants to the water before mixing.

9. The method according to claim 7, further comprising the step of configuring the loose bulk fill as a layered structure of at least two adsorber-binder phases, wherein each adsorber-binder phase has different quantities of sorption-promoting substances mixed into each individual phase.

10. The method according to claim 6, further comprising the step of adding water-soluble or water-dispersible sorption-promoting adjuvants to the water before mixing.

11. The method according to claim 10, further comprising the step of combining at least two shaped filters in planar fashion with one another, each shaped filter containing different sorption-promoting adjuvants.

12. The method according to claim 6, further comprising the step of configuring the loose bulk fill as a layered structure of at least two adsorber-binder phases, wherein each adsorber-binder phase has different quantities of sorption-promoting substances mixed into each individual phase.

13. A method for producing a self-supporting, shaped adsorption air filter, comprising the following steps:

a) mixing, at room temperature 70 to 95 wt % adsorber particles, 5 to 30 wt % binder particles and 15 to 70 wt % water relative to the total mixture of adsorber, binder, and water, said adsorber particles having an average size of 100 to 7000 μm, said binder particles having an average particle size from 90 to 5% of that of the adsorber particles, the melting range of the binder particles being less than that of the adsorber particles, and the binder not spreading over the adsorber surface below 100° C., wherein the mixing is done for a sufficient length of time to form a homogeneous mixture, and wherein the binder particles are a thermoplastic polyurethane having a melting range from 130° to 140° C., the thermoplastic polyurethane including a soft-segment portion of polycaprolactone and a hard-segment portion of 1,4-butanediol and 1,6-hexanediol with diphenylmethane diisocyanage, and between 130° and 180° C. the thermoplastic polyurethane occurs as a highly viscous melt with a viscosity which changes only slightly over the temperature range from 130° to 180° C.;

b) heating the mixture in a pressure tight mold at a temperature of at least 100° C. and at least 5° C. above the melting range of the binder, but below the melting range of the adsorber for a length of time sufficient for the binder particles to bind the adsorber particles to form the self-supporting shaped air filter; and c) decompressing the mold and releasing water vapor from the mold and the shaped air filter.

* * * * *

UNITED STATES PATENT AND TRADEMARK OFFICE
CERTIFICATE OF CORRECTION

PATENT NO. : 5,665,148

DATED : September 9, 1997

INVENTOR(S) : MÜHLFELD et al.

It is certified that error appears in the above-identified patent and that said Letters Patent is hereby corrected as shown below:

In column 1, line 41, change "Which" to --which--;

In column 3, line 24, change "$cm^2$" to --$cm^3$--;

In column 6, line 26, change "Comparative Example" to --Comparative example--;

In column 6, line 43, change "of a n-butane" to --of n-butane--;

In column 7, line 35, change "of mg" to --of 199 mg--;

In column 7, line 54-56, change "C., the...C., the thermoplastic" to --C., the thermoplastic;

In column 7, line 59, change "diisocyanage" to --diisocyanate--;

UNITED STATES PATENT AND TRADEMARK OFFICE
CERTIFICATE OF CORRECTION

PATENT NO. : 5,665,148
DATED : September 9, 1997
INVENTOR(S) : MÜHLFELD et al.

It is certified that error appears in the above-identified patent and that said Letters Patent is hereby corrected as shown below:

In column 8, line 53, change "diissocyanage" to --diisocyanate--; and

In column 8, line 38, change "temperature" to --temperature for about 5 minutes:    --.

Signed and Sealed this

Thirtieth Day of June, 1998

Attest:

*Attesting Officer*

BRUCE LEHMAN

*Commissioner of Patents and Trademarks*